(12) United States Patent
Liang et al.

(10) Patent No.: US 8,976,717 B2
(45) Date of Patent: Mar. 10, 2015

(54) METHOD FOR DATA FORWARDING

(75) Inventors: Huarui Liang, Beijing (CN); Hong Wang, Beijing (CN); Lixiang Xu, Beijing (CN)

(73) Assignee: Samsung Electronics Co., Ltd. (KR)

( * ) Notice: Subject to any disclaimer, the term of this patent is extended or adjusted under 35 U.S.C. 154(b) by 275 days.

(21) Appl. No.: 13/522,896

(22) PCT Filed: Jan. 12, 2011

(86) PCT No.: PCT/KR2011/000199
§ 371 (c)(1),
(2), (4) Date: Jul. 18, 2012

(87) PCT Pub. No.: WO2011/090290
PCT Pub. Date: Jul. 28, 2011

(65) Prior Publication Data
US 2012/0294283 A1    Nov. 22, 2012

(30) Foreign Application Priority Data
Jan. 19, 2010   (CN) .......................... 2010 1 0003382

(51) Int. Cl.
*H04B 7/00*       (2006.01)
*H04W 4/00*       (2009.01)
*H04W 36/00*      (2009.01)

(52) U.S. Cl.
CPC ............................... *H04W 36/0055* (2013.01)
USPC .......................................... 370/310; 370/331

(58) Field of Classification Search
CPC ....................... H04W 36/0055; H04W 36/0005
USPC ................................ 370/310, 331; 455/78, 91
See application file for complete search history.

(56) References Cited

U.S. PATENT DOCUMENTS 8,705,354 B2 *    4/2014    Takano et al. ................. 370/230
2011/0116469 A1 *  5/2011   Bi et al. ........................ 370/331

OTHER PUBLICATIONS

3GPP TSG SA WG2 #75, TD S2-096015 "Local GW based Architecture", NEC, Kyoto, Japan, Aug. 31-Sep. 4, 2009, 8 pages.*
3GPP TSG SA WG2 Architecture—S2#58, S2-072418 "UE Requested Bearer Establishment to a new PDN GW" Qualcom Europe, Nortel; Orlando, USA Jun. 25-29, 2007, 2 pages.*
3GPP TR 23.829, "3rd Generation Partnership Project; Technical SPecification Group Servies and System Aspects; Local IP Access and Selected IP Traffic Offload", Nov. 2009, 3GPP, all pages.*
Gupta, "LTE Advanced—LIPA and SIPTO", Jan. 2012, Aricent, all pages.*
PCT/ISA/237 Written Opinion issued on PCT/KR2011/000199 (pp. 4).

(Continued)

*Primary Examiner* — Kwang B Yao
*Assistant Examiner* — Adam Duda
(74) *Attorney, Agent, or Firm* — The Farrell Law Firm, P.C.

(57) ABSTRACT

The present invention provides a method for data forwarding. The method includes: transmitting, by a source system, Selected IP Traffic Offload (SIPTO)/Local Internet Protocol Access (LIPA) indication information to a destination system, the SIPTO/LIPA indication information indicating that the source system adopts an optimized user plane network structure; performing, by the destination system, an optimized data forwarding mechanism after receiving the SIPTO/LIPA indication information. According to the present invention, it can be ensured that a system sets up an optimized data forwarding mechanism during a handover process of a terminal.

9 Claims, 4 Drawing Sheets

(56) References Cited

OTHER PUBLICATIONS

PCT/ISA/210 Search Report issued on PCT/KR2011/000199 (pp. 3).
Yegani, Parviz, The Network of the Future (The All-IP Network), Presentation to IEEE Globecom, Dec. 2, 2009, Honolulu, HI, (pp. 29).
3GPP TR 23.829 VO.3.1. Nov. 2009, 3rd Generation Partnership Project: Technical Specification Group Services and System Aspects: Local IP Access and Selected Traffic Offload: (Release 10) (pp. 26).

* cited by examiner

------ Uplink data forwarding channel
—·—·— Downlink data forwarding channel

------ Uplink data forwarding channel
—·—·— Downlink data forwarding channel

METHOD FOR DATA FORWARDING

PRIORITY

This application claims priority to International Patent Appl. No. PCT/KR2011/000199 filed Jan. 12, 2011, and to Chinese Patent Application No. 201010003382.5 filed Jan. 19, 2010, each of which is incorporated herein by reference.

TECHNICAL FIELD

The present invention relates to mobile communications technologies, and more particularly, to a method for data forwarding.

BACKGROUND ART

The structure of a System Architecture Evolution (SAE) system is shown in FIG. 1. The structure of the conventional SAE system will be described briefly with reference to FIG. 1 hereinafter.

User Equipment (UE) 101 is a terminal device adapted to transmit and receive data.

An EUTRAN 102 is a radio access network in the SAE system. The EUTRAN 102 includes an eNB, is adapted to provide the UE with an interface for accessing a radio network, and is connected with a Mobile Management Entity (MME) 103 and a user plane entity, i.e. Serving Gateway (SGW) 104, via S1 interfaces respectively.

The MME 103 is adapted to manage mobile contexts and session contexts of the UE, and store security-relevant information of users.

The SGW 104 is mainly adapted to provide a function of a user plane.

A S1-MME interface is adapted to establish a radio access bearer for the UE and forward a message transmitted by the UE to the MME 103 via the radio access network.

Functions provided by the MME 103 and the SGW 104 together are similar to functions of a Serving GPRS Support Node (SGSN) 108. The MME 103 and the SGW 104 may be located in one physical entity.

A Packet Data Network Gateway (PGW) 105 is adapted to perform functions such as charging and legal monitoring. The SGW 104 and the PGW 105 may be located in one physical entity.

A Policy and Charging Rule Function entity (PCRF) 106 is adapted to provide a Quality of Service (QoS) policy and a charging rule.

The SGSN 108 is a network node device in the UMTS to provide routing for data transmission. The conventional SGSN finds a corresponding Gateway GPRS Support Node (GGSN) according to Access Point Name.

A Home Subscriber Server (HSS) 109 is a home subsystem of the UE, and is adapted to store subscriber information, including: a current location of the UE, an address of a serving node, security-relevant information of a subscriber and Packet Data Protocol (PDP) contexts activated by the UE, etc.

Along with an increase in the data rate of UE services, the operator has new requirements for the conventional SAE system: proposing that a PDN connection access point of the UE can be closer to the radio access network when the UE accesses a particular service. If a network can support this capability, costs of a transport network will be effectively reduced and better service experience of the high data rate can be provided. In the conventional recommendation, this capability is named Selected IP Traffic Offload (SIPTO). The SIPTO may be applied to networks supporting the eNB and networks supporting Home NodeB (HNB).

In 3GPP, it is proposed that a network needs to support capabilities of SIPTO and Local IP Access (LIPA). The SIPTO includes two situations:

1) The UE accesses a service of the Internet or other outer networks through a Home enhanced NodeB (HeNB)/Home NodeB (HNB), and the network needs to select a user plane node adjacent to the access network or a user plane node inside the access network.

2) The UE accesses a service of the Internet or other outer networks through the eNB, and the network needs to select a user plane node adjacent to the access network or a user plane node inside the access network.

The LIPA means that the UE access a home network through the HeNB/HNB. When performing the LIPA, the network selects a user plane node inside a HeNB/HNB access network for the UE.

In order to support this capability, the network may offload a particular IP traffic which the UE accesses. Therefore, it is required to select or reselect an appropriate user plane network device or gateway (called by a joint name of user plane node hereinafter). For example, with respect to a LTE network, it may be related to selecting or reselecting a SGW and a PGW. With respect to a 3G network, it may be related to selecting or reselecting a GGSN and a GGSN. As shown in FIG. 2, the connection indicated by the dashdotted line includes the SGW and the PGW which are selected for the UE before the SIPTO is performed, the connection indicated by the dashed line includes the SGW and the PGW which are selected for the UE after the SIPTO is performed and which are closer to the access network.

DISCLOSURE OF INVENTION

Technical Problem

Currently, the 3GPP standard conference is discussing the following: if the system performs particular IP traffic offload on part of the services of the UE, i.e. selects a user plane node closer to the access system for the UE, whether it is needed to support service connectivity when the UE leaves a radio access network (hereinafter HeNB, HNB, eNB and Radio Network Controller (RNC) are called the radio access network by a joint name) which the UE currently accesses; if it is needed to support the service connectivity, it is needed to consider whether the conventional handover can be completely reused and it is also needed to consider how to ensure resource optimization during the data forwarding.

Solution to Problem

In view of the above, an objective of embodiments of the present invention is to provide a method for data forwarding, so as to ensure that an optimized data forwarding mechanism is established during a handover process in which a terminal is handing over from a source system supporting SIPTO and/or LIPA.

To achieve the above objective, an embodiment of the present invention provides a method for data forwarding. The method includes:

transmitting, by a source system, Selected IP Traffic Offload (SIPTO)/Local Internet Protocol Access (LIPA) indication information to a destination system, the SIPTO/LIPA indication information indicating that the source system adopts an optimized user plane network structure; and performing, by the destination system, an optimized data forwarding mechanism after receiving the SIPTO/LIPA indication information.

As can be seen from the above, during the handover process of the UE, the source system transmits the SIPTO/LIPA indication information for indicating that the source system adopts the optimized user plane network structure to the destination system, and the destination system performs the optimized data forwarding mechanism during the switch process according to the indication information received. Thereby, it can be ensured that the optimized data forwarding mechanism is set up when a terminal is handing over from the source system supporting SIPTO and/or LIPA to another system.

The optimized data forwarding mechanism provided by the present invention adopts the manner of forwarding the uplink data to be forwarded through the user plane path of the source system, but not through a path from the source user plane node to the destination user plane node and next to the destination base station and then to the destination user plane node again and finally to the PGW or GGSN. Thereby, the destination system need not reserve resources for the uplink data forwarding, and thus resource optimization is realized.

Advantageous Effects of Invention

According to the present invention, during the handover process of the UE, the source system transmits the SIPTO/LIPA indication information for indicating that the source system adopts the optimized user plane network structure to the destination system, and the destination system performs the optimized data forwarding mechanism during the switch process according to the indication information received. Thereby, it can be ensured that the optimized data forwarding mechanism is set up when a terminal is handing over from the source system supporting SIPTO and/or LIPA to another system.

MODE FOR THE INVENTION

To make the objective, technical scheme and merits of the present invention clearer, the present invention will be described hereinafter in detail with reference to accompanying drawings and embodiments.

The main idea of the present invention is that: a source system transmits SIPTO/LIPA indication information for indicating that the source system adopts an optimized user plane network structure to a destination system, and the destination system performs an optimized data forwarding mechanism after receiving the SIPTO/LIPA indication information.

That the source system adopts the optimized user plane network structure refers to: the source system has activated a SIPTO or LIPA service for the UE and thereby selects user plane nodes closer to the radio access network for the UE.

In a LTE system, the user plane nodes in this invention include a SGW and a PGW, and the radio access network includes a HeNB, HNB or eNB (the HeNB, the HNB and the eNB are called base station by a joint name). In a 3G network, the user plane nodes in this invention include a SGSN and a GGSN, and the radio access network refers to a RNC. Embodiments of the present invention take the LTE system as an example. If a GPRS system is taken as an example, the base station in the embodiments of the present invention is replaced by the RNC, the MME is replaced by the SGSN and the PGW is replaced by the GGSN.

The optimized data forwarding mechanism provided by this invention will be first described in detail hereinafter.

There are two handover types: S1 handover and X2 handover. The S1 handover usually means that there is no X2 interface between the source base station and the destination base station and that handover signalling between the source base station and the destination base station need be forwarded by the MME of a core network. The X2 handover usually means that there is an X2 interface between the source base station and the destination base station and that handover signalling can be directly transmitted between the source base station and the destination base station without being forwarded by the core network. In the S1 handover, data forwarding should be performed through the core network, which is called indirect data forwarding mechanism. In the X2 handover, the data forwarding need not be performed through the core network, which is called direct data forwarding mechanism.

Figure 1:
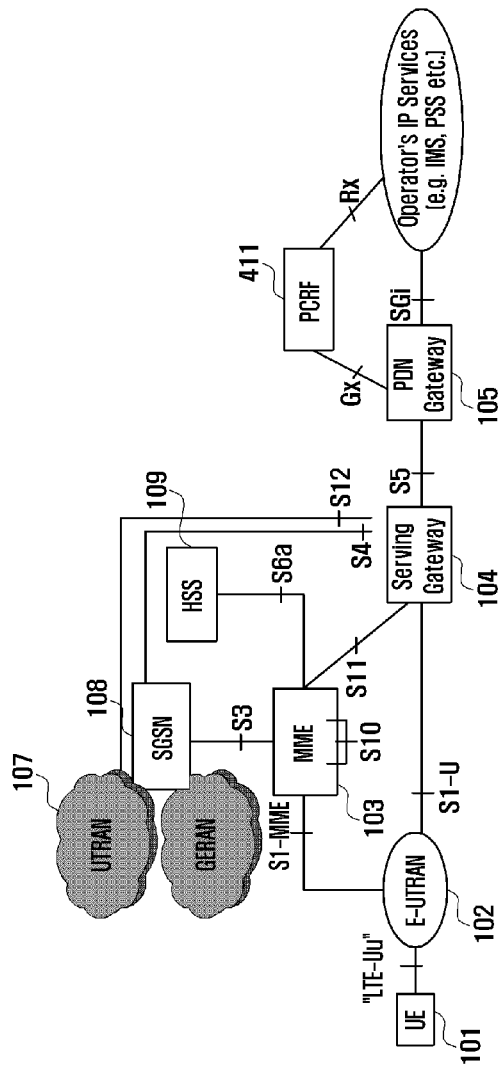
FIG. 1 is a schematic diagram illustrating a structure of a conventional SAE system.
Figure 2:
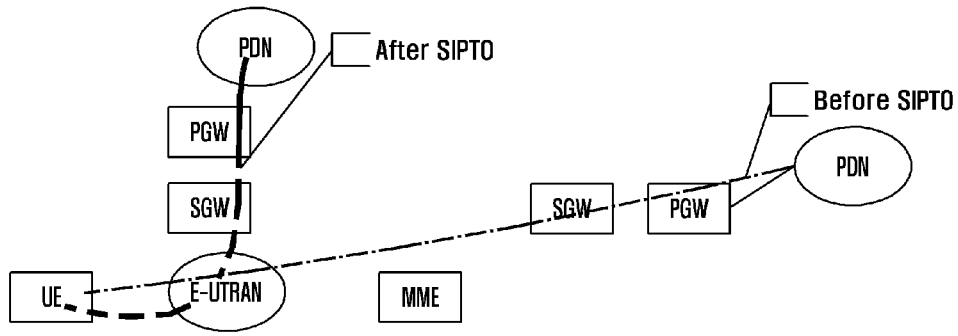
FIG. 2 is a schematic diagram illustrating selection of a SGW and a PGW which are closer to an access network for UE.
Figure 3A:
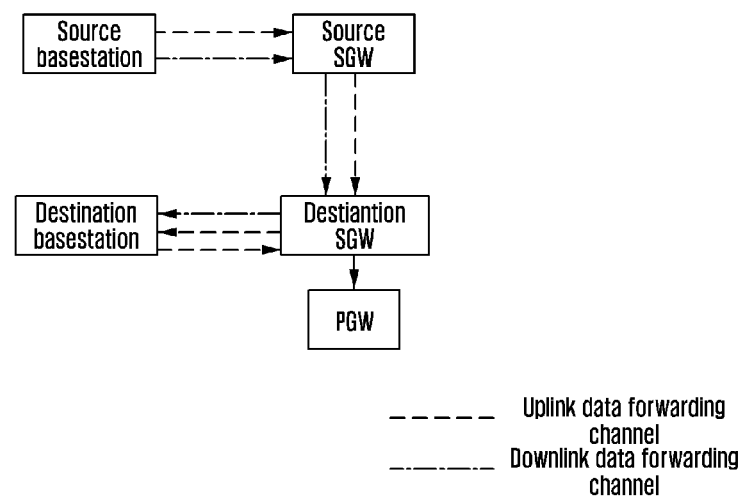
FIG. 3(a) is a schematic diagram illustrating a conventional indirect data forwarding mechanism.

FIG. 3(a) is a schematic diagram illustrating a conventional indirect data forwarding mechanism. Refer to FIG. 3, the conventional indirect data forwarding mechanism is: setting up respective temporary tunnels for uplink and downlink services to forward uplink data and downlink data. In FIG. 3(a), the dashed line illustrates an uplink data forwarding channel and the dashdotted line illustrates a downlink data forwarding channel. Whether it is the uplink data or the downlink data, both are transmitted by the source base station to the source SGW, then forwarded by the source SGW to the destination SGW, and then forwarded by the destination SGW to the destination base station. After receiving the uplink data and the downlink data, the destination base station forwards the downlink data to the UE; and forwards the uplink data to the PGW through the user plane bearer of the destination system, i.e. after receiving the uplink data, the destination base station forwards the uplink data to the destination SGW and then the destination SGW forwards the uplink data to the PGW. The PGW is the same one before and after the handover.

With respect to the data that the SIPTO/LIPA service is activated, system resources will be wasted if the conventional indirect data forwarding mechanism shown in FIG. 3(a) is still used. But instead, with respect to the SIPTO/LIPA service, the source system selects the SGW and the PGW closer to the access system and the PGW is the same one before and after the handover, and thereby, the uplink data may be directly forwarded from the source base station via the source SGW to the PGW.

Figure 3B:
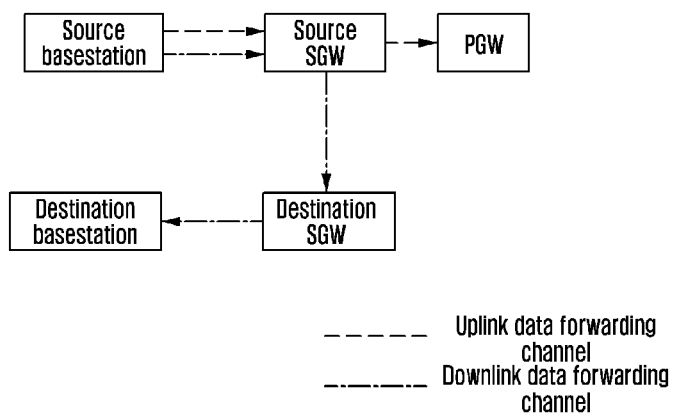
FIG. 3(b) is a schematic diagram illustrating an optimized indirect data forwarding mechanism according to an embodiment of the present invention.

Thus, an embodiment of the present invention provides an optimized indirect data forwarding mechanism shown in FIG. 3(b). Refer to FIG. 3(b), the uplink data forwarding channel is: from the source base station to the source SGW and then to the PGW, but not from the source base station to the source SGW and next to the destination SGW and then to the destination base station and then to the destination SGW again and finally to the PGW. In practical applications, there may be two types of user plane paths: one is from the base station to the PGW directly and the other is from the base station to the PGW via the SGW. FIG. 3(b) takes the user plane path from the base station to the PGW via the SGW as an example. If the UE is in an activated state and the user plane path in the source system is from the base station to the PGW directly, the uplink data forwarding channel is from the source base station to the PGW directly. In the optimized indirect data forwarding mechanism according to embodiments of the present invention, the destination system need not reserve resources for uplink data forwarding, and thereby realizing resources optimization.

Based on the optimized indirect data forwarding mechanism shown in FIG. 3(b) of the present invention, specific applications of the indirect data forwarding mechanism will hereinafter described with reference to an embodiment.

Figure 4:
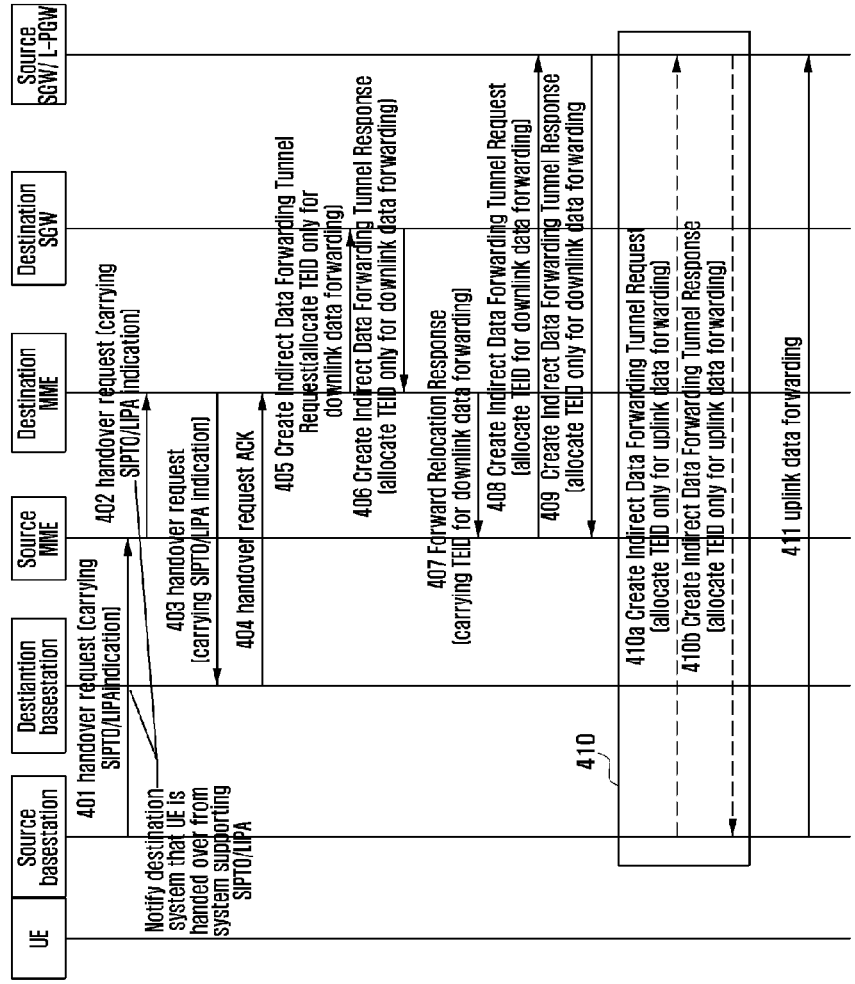
FIG. 4 is a schematic diagram illustrating signalling interaction during a handover process according to Embodiment 1 of the present invention.

FIG. 4 is a schematic diagram illustrating signalling interaction during a handover process according to Embodiment 1 of the present invention. As shown in FIG. 4, the handover process is S1 handover, and the signalling interaction may relate to entities including: UE, a source base station, a destination base station, a source MME, a destination MME, a destination SGW, a source SGW, and a PGW.

In FIG. 4, the PGW is represented by Local-PGW (called L-PGW for short). The L-PGW refers to the PGW which is selected by the system for the UE after the SIPTO or LIPA is activated and which is closer to the access system. Because a user plane path may be from a base station directly to the PGW or may be from the base station to the SGW and then to the PGW, the source SGW or the L-PGW is represented by "source SGW/L-PGW". If the user plane path is from the base station directly to the PGW, it should be the L-PGW that interacts with other entities, and thus the "source SGW/L-PGW" refers to the L-PGW in this case. If the user plane path is from the base station to the SGW and then to the PGW, it should be the SGW that interacts with other entities, and thus the "source SGW/L-PGW" refers to the source SGW in this case. Besides, the source SGW and the L-PGW may be located in one logical entity, and the "source SGW/L-PGW" refers to the source SGW and the L-PGW in this case.

The signalling interaction shown in FIG. 4 includes:

Step 401: The source base station transmits a handover request to the source MME.

The handover request may carry SIPTO/LIPA indication information, which indicates that the bearer corresponding to the handover request activates the SIPTO or LIPA. The SIPTO/LIPA indication information aims at notifying the destination system that the SIPTO or LIPA has been activated for all or part of services in the source system, i.e. the source system selects a user plane node closer to the access system for a service when activating the service. Without particular description, the user plane node mentioned in the present invention may be the SGW and/or PGW. Alternatively, the handover request may not carry SIPTO/LIPA indication information.

Step 402: The source MME forwards the handover request to the destination MME, the handover request carrying the SIPTO/LIPA indication information.

If the source base station transmits the handover request carrying the SIPTO/LIPA indication information in Step 401, the SIPTO/LIPA indication information received from the source base station is forwarded via the handover request in Step 402. If the source base station transmits the handover request without carrying the SIPTO/LIPA indication information in Step 401, in Step 402, the source MME may determine, according to context information of the UE, whether the SIPTO or LIPA service is activated for the UE. If the SIPTO or LIPA service is activated for the UE, the source MME transmits the handover request carrying the SIPTO/LIPA indication information to the destination MME.

Step 403: The destination MME transmits the handover request to the destination base station, the handover request carrying the SIPTO/LIPA indication information obtained from the source system.

Step 404: The destination base station transmits handover request Acknowledgement (ACK) to the destination MME.

According to the core idea, the destination system determines, according to the SIPTO/LIPA indication information transmitted from the source system, whether to perform the optimized data forwarding mechanism during the handover process. To realize data forwarding, it is required that the base station and the SGW allocate Tunnel End Identities (TEID) for the data forwarding. The TEID is used for identifying a destination address of data transmission. Both the base station and the SGW can allocate uplink and downlink TEIDs respectively. The uplink and downlink TEIDs allocated by the base station and the SGW are respectively used for indicating destination addresses of uplink and downlink data.

In the method for data forwarding provided by the present invention, at a destination system side, whether to perform the optimized data forwarding mechanism may be determined by the destination base station or the destination MME, or may be determined by the destination SGW. Therefore, Step 404 includes the following two cases:

The first case: if whether to perform the optimized data forwarding mechanism is determined by the destination base station, in this step, the destination base station needs to determine whether to perform the optimized data forwarding mechanism. If the destination base station determines to perform the optimized data forwarding mechanism, the destination base station allocates the TEID only for the downlink data forwarding according to the optimized data forwarding mechanism provided by the present invention, and transmits the TEID to the destination MME via the handover request ACK. If the destination base station determines not to perform the optimized data forwarding mechanism, the destination base station can allocate TEIDs respectively for uplink and downlink data forwarding according to the prior art, transmits the TEIDs allocated respectively for uplink and downlink data forwarding to the destination MME via the handover request ACK, and performs the subsequent procedure according to the prior art.

The second case: if whether to perform the optimized data forwarding mechanism is determined by the destination MME or the destination SGW, in this step, the destination base station can allocate TEIDs respectively for uplink and downlink data forwarding according to the prior art, transmits the TEIDs allocated respectively for uplink and downlink data forwarding to the destination MME via the handover request ACK, and performs the subsequent procedure according to the prior art.

Step 405: The destination MME transmits a Create Indirect Data Forwarding Tunnel Request to the destination SGW.

According to Step 404, Step 405 includes the following three cases:

The first case: if whether to perform the optimized data forwarding mechanism is determined by the destination base station, the destination MME transmits a Create Downlink Indirect Data Forwarding Tunnel Request to the destination SGW if the destination MME receives the handover request ACK that only carries the TEID allocated for the downlink data forwarding, and the destination MME transmits a Create Uplink and Downlink Indirect Data Forwarding Tunnel Request according to the prior art to the destination SGW if the destination MME receives the handover request ACK that carries the TEIDs allocated for the uplink and downlink data forwarding.

The second case: if whether to perform the optimized data forwarding mechanism is determined by the destination MME, in this step, the destination MME needs to determine whether to perform the optimized data forwarding mechanism. If the destination MME determines to perform the optimized data forwarding mechanism, the destination MME transmits a Create Downlink Indirect Data Forwarding Tunnel Request to the destination SGW according to the optimized data forwarding mechanism provided by the present invention. Otherwise, the destination MME transmits a Create Uplink and Downlink Indirect Data Forwarding Tunnel Request to the destination SGW according to the prior art.

The third case: if whether to perform the optimized data forwarding mechanism is determined by the destination SGW, the destination MME transmits a Create Uplink and Downlink Indirect Data Forwarding Tunnel Request to the destination SGW according to the prior art.

Step 406: The destination SGW allocates the TEID for data forwarding and returns the TEID to the destination MME via a Create Indirect Data Forwarding Tunnel Response.

According to Steps 404 and 405, Step 406 includes the following two cases:

The first case: if whether to perform the optimized data forwarding mechanism is determined by the destination base station or the destination MME, the destination SGW allocates the TEID only used for the downlink data forwarding for the UE if receiving the Create Downlink Data Indirect Forwarding Tunnel Request from the destination MME, and allocates the TEIDs used for both the uplink and downlink data forwarding for the UE according to the prior art if receiving the Create Uplink and Downlink Indirect Data Forwarding Tunnel Request.

The second case: if whether to perform the optimized data forwarding mechanism is determined by the destination SGW, in this step, the destination SGW needs to determine whether to perform the optimized data forwarding mechanism. If the destination SGW determines to perform the optimized data forwarding mechanism, the destination SGW allocates the TEID only used for the downlink data forwarding for the UE according to the optimized data forwarding mechanism provided by the present invention. Otherwise, the destination SGW allocates the TEIDs used for both the uplink and downlink data forwarding for the UE according to the prior art. If whether to perform the optimized data forwarding mechanism is determined by the destination SGW, the destination SGW needs to obtain an indication that the source system has activated the SIPTO/LIPA, that is, the destination MME needs to transmit the SIPTO/LIPA indication information to the destination SGW.

Step 407: The destination MME transmits a Forward Relocation Response to the source MME, the Forward Relocation Response carrying the TEID information only used for the downlink data forwarding.

Step 408: According to the TEID information, the source MME learns that the destination system starts up the optimized data forwarding mechanism, and transmits a Create Indirect Data Forwarding Tunnel Request to the source SGW/L-PGW, the Create Indirect Data Forwarding Tunnel Request is used for requesting the TEID only for the downlink data forwarding.

Step 409: The source SGW/L-PGW allocates a temporary TEID for the downlink data forwarding, and returns a Create Indirect Data Forwarding Tunnel Response carrying the temporary TEID to the source MME.

Step 410: A tunnel used for the uplink data forwarding is set up between the source base station and the source SGW/L-PGW.

In the present invention, two manners may be used for the uplink data forwarding:

The first manner: because the user plane path at the source system side has not been released yet, the source base station can transmit the uplink data to be forwarded to the L-PGW through the user plane path of the source system directly, for example, transmit the uplink data from the base station directly to the L-PGW, or from the base station to the source SGW and then to the L-PGW. In the first manner, Step 410 need not be performed.

The second manner: the source base station requests the source SGW/L-PGW to allocate a temporary TEID used for the uplink forwarding data, and then transmits the uplink data to the L-PGW through a tunnel corresponding to the temporary TEID. If the second manner is adopted, the source base station needs to transmit a Create Indirect Data Forwarding Tunnel Request to the source SGW/L-PGW and needs to indicate that the TEID is allocated only for the uplink data forwarding; the source SGW/L-PGW allocates the TEID for the uplink data forwarding according to the Create Indirect Data Forwarding Tunnel Request and transmits a Create Indirect Data Forwarding Tunnel Response carrying the allocated TEID to the source base station. In this case, signaling interaction shown in Steps 410*a* and 410*b* in FIG. 4 can be performed to set up the tunnel for the uplink data forwarding.

Step 411: The source base station transmits the uplink data to be forwarded to the source SGW/L-PGW.

Steps identical to the prior art are omitted in the handover process in this embodiment. In this embodiment, the part irrelevant to the present technical scheme is not described in detail or is omitted.

The conventional direct data forwarding mechanism has the same defect as the conventional indirect data forwarding mechanism shown in FIG. 3(*a*). The defect can also be overcome by a mechanism similar to the optimized data forwarding mechanism shown in FIG. 3(*b*), which will be described hereinafter according to an embodiment.

Figure 5:
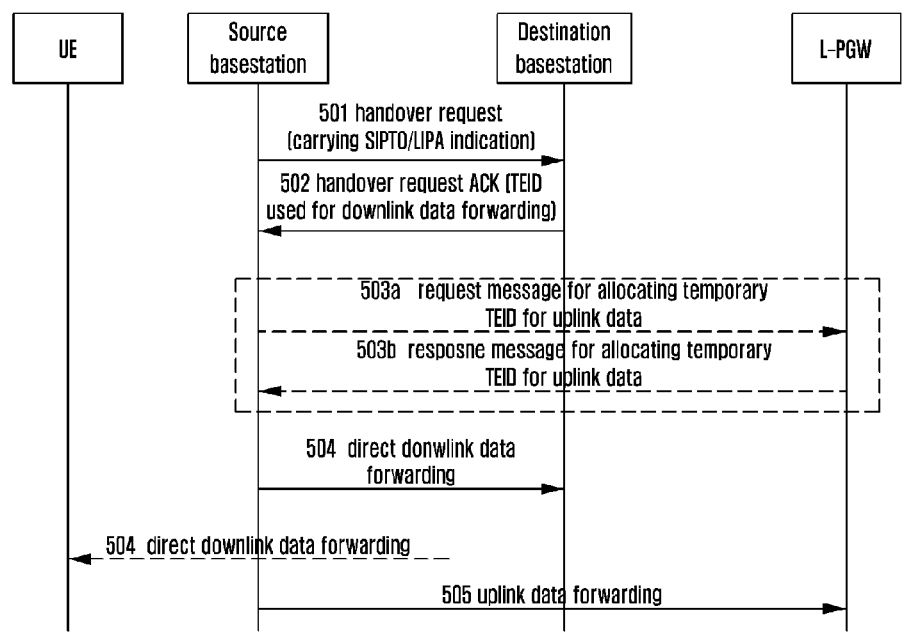
FIG. 5 is a schematic diagram illustrating signalling interaction during a handover process according to Embodiment 2 of the present invention.

FIG. 5 is a schematic diagram illustrating signalling interaction during a handover process according to Embodiment 2 of the present invention. As shown in FIG. 5, the handover process is X2 handover, and the signalling interaction relates to entities including: UE, a source base station, a destination base station and a L-PGW. The L-PGW refers to the same as FIG. 4, and will not be described again.

The signalling interaction shown in FIG. 5 includes:

Step 501: The source base station transmits a handover request to the destination base station. The handover request carries SIPTO/LIPA indication information, which indicates that the bearer corresponding to the handover request activates the SIPTO or LIPA. The SIPTO/LIPA indication information aims at notifying the destination system that the SIPTO or LIPA has been activated for all or part of services in the source system, i.e. the source system selects a user plane node closer to the access system for a service when activating the service. Without particular description, the user plane node mentioned in the present invention may be the SGW and/or PGW.

Step 502: After receiving the handover request carrying the SIPTO/LIPA indication information, the destination base station determines whether to perform an optimized data forwarding mechanism. If the destination base station determines to perform the optimized data forwarding mechanism, the destination base station may allocate a TEID only used for downlink data forwarding, and may transmit the TEID to the source base station via handover request acknowledge.

Step 503: A tunnel used for the uplink data forwarding is set up between the source base station and the L-PGW.

Similar to Step 410, Step 503 may also include two manners for the uplink data forwarding.

The first manner is: the user plane path which has not been released at a source system side is adopted to transmit the uplink data to be forwarded to the L-PGW. In the first manner, Step 503 need not be performed. The second manner is: the source base station requests the L-PGW to allocate a temporary TEID used for the uplink forwarding data, and then transmits the uplink data to the L-PGW through a tunnel corresponding to the temporary TEID. In the second manner, signaling interaction shown in Steps 503a and 503b may be adopted to set up the tunnel used for the uplink data forwarding.

Step 504: The source base station forwards the downlink data to the destination base station through a tunnel corresponding to the TEID allocated by the destination base station. After receiving the downlink data, the destination base station forwards the downlink data to the UE through a corresponding tunnel.

Step 505: The source base station transmits the uplink data to be forwarded to the L-PGW.

Steps identical to the prior art are omitted in the handover process in this embodiment. In this embodiment, the part irrelevant to the present technical scheme is not described in detail or is omitted.

After the handover process is finished, the system transmits a release message to request releasing the temporary TEID, and releases the tunnel used for the data forwarding. The release message is the same as that in the convention handover process and will not be described again.

Figure 6:
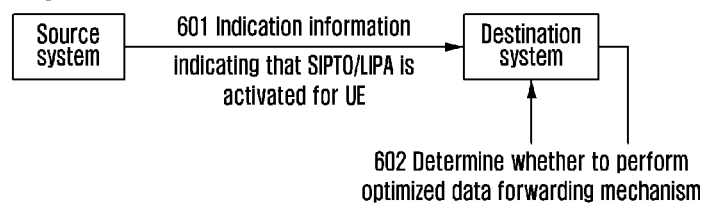
FIG. 6 is a schematic diagram illustrating principles of a method for data forwarding according to an embodiment of the present invention.

FIG. 6 is a schematic diagram illustrating principles of a method for data forwarding according to an embodiment of the present invention. As shown in FIG. 6, the method includes steps of:

Step 601: During a handover process of UE, a source system transmits indication information for indicating that SIPTO/LIPA has been activated for the UE to a destination system.

In this step, the source system may determine whether a currently-activated service of the UE is the SIPTO or LIPA according to context information of the UE, and transmits the SIPTO/LIPA indication information to the destination system if the currently-activated service of the UE is the SIPTO or LIPA. For example, a base station may perform the determining according to information of a user plane node which the UE currently accesses, and the information may be an IP address of the user plane node. Specifically, the base station may preconfigure address information of adjacent user plane nodes, and then detect whether the preconfigured address information includes an address consistent with the IP address of the user plane node which the UE currently accesses, so as to determine whether the SIPTO/LIPA has been activated for the UE. For another example, it is possible that a particular APN is defined in the system to identifying the SIPTO or LIPA service, or it is also possible that a corresponding relation between the APN and information of a user plane node is defined to identify the SIPTO or LIPA service, and thus, if the SIPTO/LIPA is currently activated for the UE, whether the SIPTO/LIPA is currently activated for the UE may be determined according to the APN.

Step 602: The destination system determines whether to perform an optimized data forwarding mechanism during the handover process according to the indication information received.

After obtaining the SIPTO/LIPA indication information, the destination system determines whether to perform the optimized data forwarding mechanism. Specifically, the destination system may perform the determining according to capabilities of the current system or according to subscription information of the UE. For example, when user plane node resources of the current system are abundant, it is also possible to ensure accesses from all users without performing the optimized data forwarding mechanism. In this case, the current system may perform the determining according to capabilities of a current user plane node, or determine whether to perform the optimized data forwarding for a user according to the subscription information of the UE.

After determining to start up the optimized data forwarding mechanism, the destination system may allocate a temporary TEID used for the data forwarding only for the downlink data. And the uplink data may be forwarded through an original user plane of the system, or, the source base station may request the destination SGW or the PGW to directly allocate a temporary TEID for the uplink data to forward the uplink data.

As can be seen from the above embodiment, during the handover process of the UE, the source system transmits the SIPTO/LIPA indication information indicating that the source system adopts an optimized user plane network structure, and the destination system performs the optimized data forwarding mechanism during the handover process according to the indication information received. Thereby, it can be ensured that the system can set up the optimized data forwarding mechanism when a terminal hands over from a system supporting the SIPTO and/or LIPA to another system.

The optimized data forwarding mechanism provided by the present invention adopts the manner of forwarding the uplink data to be forwarded through the user plane path of the source system, but not through a path from the source user plane node to the destination user plane node and next to the destination base station and then to the destination user plane node again and finally to the PGW or GGSN. Thereby, the destination system need not reserve resources for the uplink data forwarding, and thus resource optimization is realized.

The foregoing is only embodiments of the present invention. The protection scope of the present invention, however, is not limited to the above description. Any change or substitution, easily occurring to those skilled in the art, should be covered by the protection scope of the present invention.

The invention claimed is:

1. A method for data forwarding, comprising:
 transmitting, by a source system, Selected IP Traffic Offload (SIPTO)/Local Internet Protocol Access (LIPA) indication information to a destination system, the SIPTO/LIPA indication information indicating that SIPTO/LIPA has been activated; and performing, by the destination system, an optimized data forwarding mechanism after receiving the SIPTO/LIPA indication information, wherein the optimized data forwarding mechanism comprises, with respect to uplink data to be forwarded, forwarding the uplink data within the source system by a source radio access network to a user plane node, but not forwarding the uplink data through the destination system.

2. The method of claim 1, wherein transmitting the SIPTO/LIPA indication information by the source system to the destination system comprises:

transmitting, by the source radio access network, a handover request to a source Mobile Management Entity (MME), the handover request carrying the SIPTO/LIPA indication information; and forwarding, by the source MME, the handover request to a destination MME, the handover request carrying the SIPTO/LIPA indication information.

3. The method of claim 1, wherein transmitting the SIPTO/LIPA indication information by the source system to the destination system comprises:

after receiving a handover request from the source radio access network, transmitting, by a source Mobile Management Entity (MME), the handover request to a destination MME, the handover request carrying the SIPTO/LIPA indication information.

4. The method of claim 2, further comprising:

after receiving the handover request from the source MME, transmitting, by the destination MME, the handover request to a destination radio access network, the handover request carrying the SIPTO/LIPA indication information.

5. The method of claim 1, wherein transmitting the SIPTO/LIPA indication information by the source system to the destination system comprises:

transmitting, by the source radio access network, a handover request carrying the SIPTO/LIPA indication information to a destination radio access network.

6. The method of claim 1, wherein the optimized data forwarding mechanism comprises:

allocating, by a destination radio access network, a Tunnel End Identity (TEID) for downlink data forwarding to User Equipment (UE), and transmitting a handover request acknowledgment carrying the TEID to a destination Mobile Management Entity (MME);

transmitting, by the destination MME, a Create Downlink Indirect Data Forwarding Tunnel Request to a destination user plane node; and allocating, by the destination user plane node, a TEID for downlink data forwarding and transmitting a Create Downlink Indirect Data Forwarding Tunnel Response carrying the TEID to the destination MME.

7. The method of claim 1, wherein the optimized data forwarding mechanism comprises:

after receiving a handover request acknowledgment transmitted by a destination radio access network, transmitting, by a destination Mobile Management Entity (MME), a Create Downlink Indirect Data Forwarding Tunnel Request to a destination user plane node; and allocating, by the destination user plane node, a Tunnel End Identity (TEID) for downlink data forwarding and transmitting the Create Downlink Indirect Data Forwarding Tunnel Response carrying the TEID to the destination MME.

8. The method of claim 1, wherein the optimized data forwarding mechanism comprises:

after receiving a Create Indirect Data Forwarding Tunnel Request transmitted by a destination Mobile Management Entity (MME), allocating, by a destination user plane node, a Tunnel End Identity (TEID) for downlink data forwarding to User Equipment (UE) and transmitting the Create Indirect Data Forwarding Tunnel Response carrying the TEID to the destination MME.

9. The method of claim 1, wherein the optimized data forwarding mechanism comprises:

allocating, by a destination radio access network, a Tunnel End Identity (TEID) for downlink data forwarding to User Equipment (UE) and transmitting a handover request acknowledgment carrying the TEID to the source radio access network.

* * * * *